United States Patent [19]

Boutmy et al.

[11] 4,387,460

[45] Jun. 7, 1983

[54] SUPPLEMENTARY INFORMATION TRANSMITTING ARRANGEMENT FOR A DIGITAL DATA TRANSMISSION SYSTEM

[75] Inventors: Patrick E. Boutmy, Paris; Gilbert J. Le Fort, Lannion, both of France

[73] Assignee: Societe Anonyme de Tele-Communication, Paris, France

[21] Appl. No.: 210,513

[22] Filed: Nov. 28, 1980

Related U.S. Application Data

[63] Continuation-in-part of Ser. No. 59,744, Jul. 23, 1979, abandoned.

[51] Int. Cl.³ .......................... H04J 3/12; H04J 15/00
[52] U.S. Cl. ................................. 370/110.4; 370/111; 370/11
[58] Field of Search .................. 370/111, 110.4, 110.1, 370/11, 119; 371/49

[56] References Cited

U.S. PATENT DOCUMENTS

| | | | |
|---|---|---|---|
| 3,283,302 | 11/1966 | Brass | 371/13 |
| 3,636,524 | 1/1972 | Holland | 370/111 |
| 3,870,828 | 3/1975 | Saliga | 370/110.4 |
| 4,151,373 | 4/1979 | Widmer et al. | 370/111 |
| 4,173,014 | 10/1979 | Leighou et al. | 371/49 |

*Primary Examiner*—Douglas W. Olms
*Attorney, Agent, or Firm*—A. A. Saffitz

[57] ABSTRACT

This invention relates to an arrangement for transmitting a digital supplementary information signal having a low rate with a digital data signal having a high rate. The insertion of the supplementary information in the data signal is based on the modification of the accumulative disparity of data signal as a function of the logic level of the supplementary information signal. According to a first embodiment, parity check words are periodically inserted in the data signal and have their accumulative disparity which depends upon the comparison of the desired parity indicated by the logic level of the supplementary information signal with the accumulative disparity of data digits between two successive parity check words. According to a second embodiment, the parity check words are words which correspond to the binary-to-ternary transcoding of a predetermined bit group of the data signal which is scrambled into a pseudo-randomized signal having a constant accumulative disparity over a predetermined period of time.

10 Claims, 9 Drawing Figures

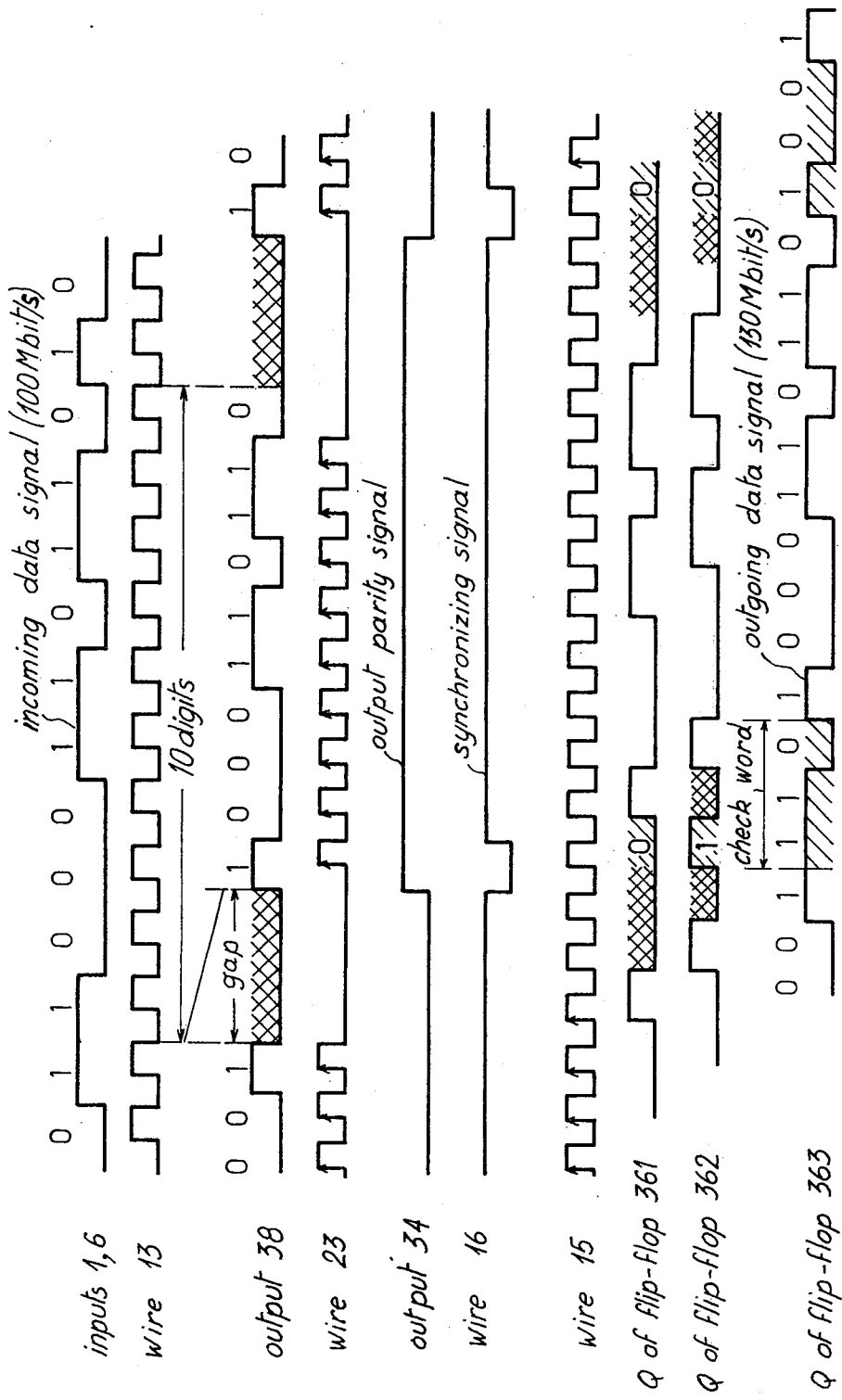

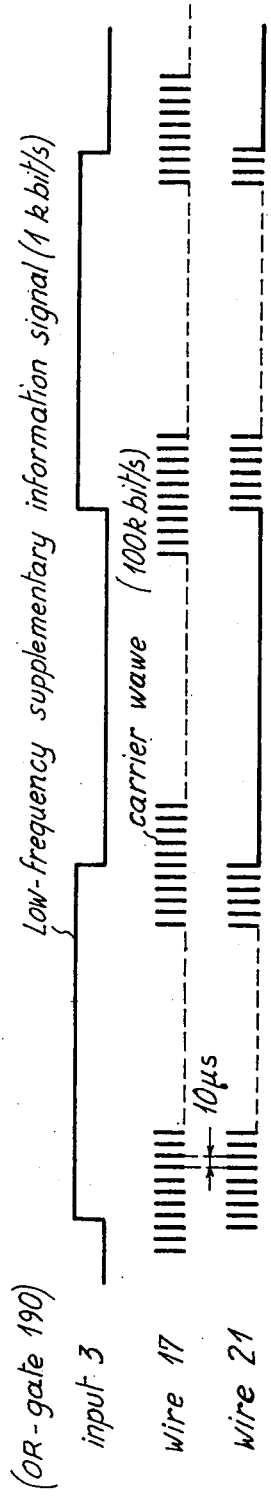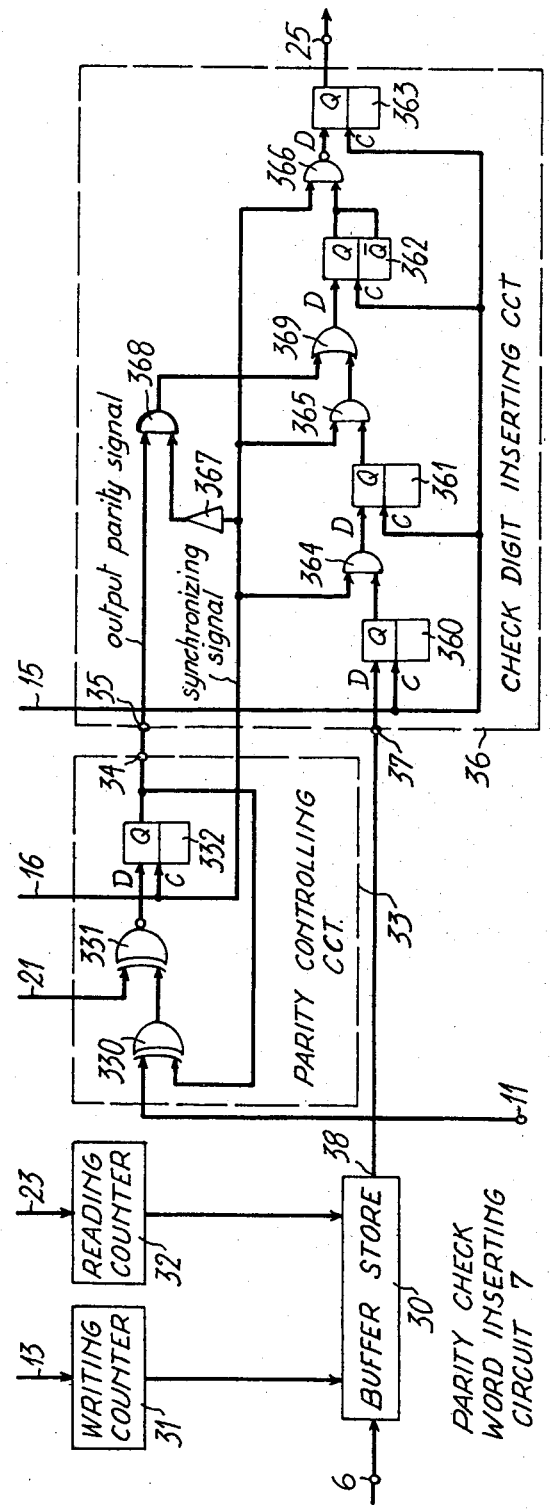

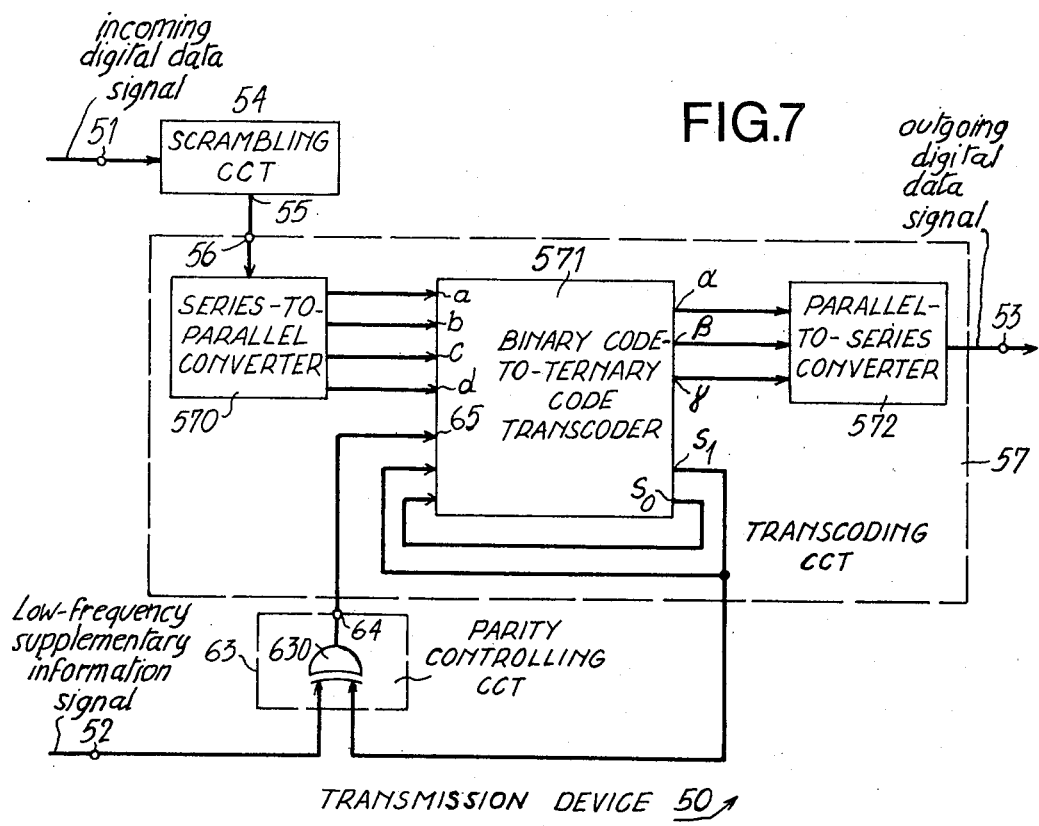
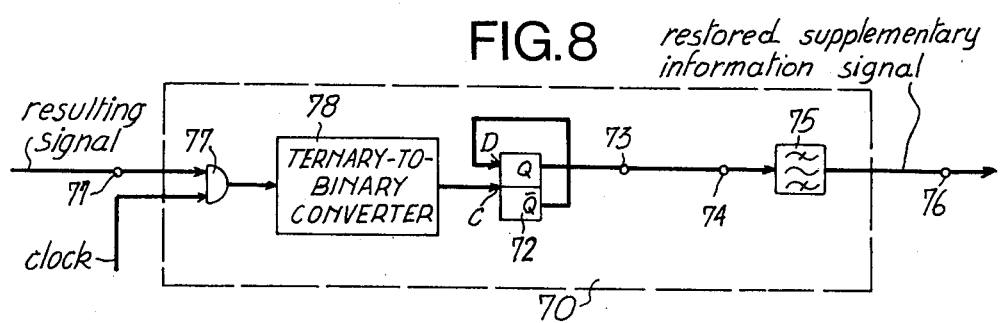
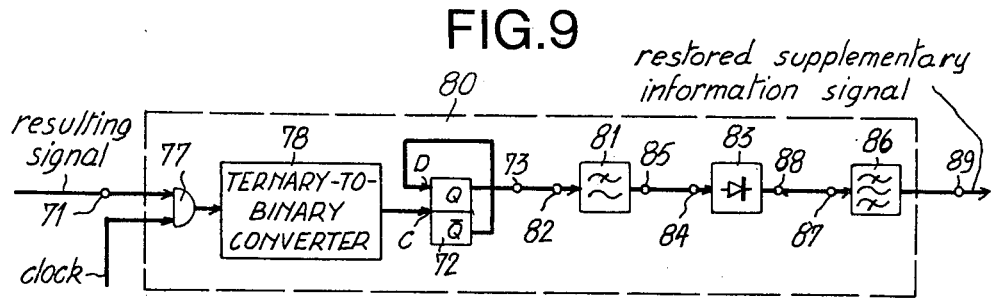

SUPPLEMENTARY INFORMATION TRANSMITTING ARRANGEMENT FOR A DIGITAL DATA TRANSMISSION SYSTEM

This application is a continuation-in-part of Ser. No. 59,744, July 23, 1979, abandoned.

BACKGROUND OF THE INVENTION

1. Field of the Invention

The present invention relates to digital data transmitting systems which convey digital words whose digits can have two logic levels (1, 0) as a binary digit, or three logic levels ($-1$, 0, 1) as a ternary digit. In the following specification, the "high"level ("H" level) indicates "1" levels, whether the levels are positive or negative.

2. Description of the Prior Art

In known digital data transmitting systems of this kind, it is often difficult to transmit a supplementary information signal without, firstly, increasing the complexity of the transmission and reception equipments and, secondly, without resorting to the use of a supplementary transmission medium, such as an auxiliary pair of coaxial cables. In a general manner, the supplementary information signal is a low-frequency wave, i.e. has a digit rate very low compared with that of the digital data signal. The supplementary information signal may be modulated by a carrier signal having a digit rate less than that of the digital data signal.

For transmitting the low-frequency supplementary information signal, the transmission arrangement embodying the invention entails a "H" level parity check. It is already known to use in repeaters a "H" level parity check method for detecting the rate of operating errors. This method is described in contributions Nos. 59-F and 54-F of the Study Commission XVIII and IV of the International Telegraph and Telephone Consultative Committee, August 1977.

This known method is particularly applicable to digital transmission systems in which the digital data signal to be transmitted is already arranged in or can be converted into a format resulting in what may be termed constant accumulated disparity signals.

The term "constant accumulated disparity" or "accumulated parity" is used to mean that over a predetermined period of time having a sufficient duration, the ratio of digits of different values is such that the signals have a substantially constant d.c. content, which may be zero in some cases. One way of achieving zero accumulated disparity signal is to have normal binary coded p.c.m. signals random scrambled at a transmitting device and descrambled at the reception device. Truly randomized signals have no d.c. content. Pseudo randomized signals can be made to have, for all practical purposes, a negligible d.c. content. The same is true of scrambled binary coded signals which are subsequently transcoded into ternary coded signals.

According to this known method, the digital data signal contains special signals the digital values of which reflect the parity of predetermined digital data signal events in the immediately preceding intervals. The special signals themselves have values which maintain the overall constant accumulated disparity of the transmitted digital data signal. The special signals are additional parity check digits which are inserted in the data signal to be transmitted. For example, the logic levels of the parity check digits must be so choosen in the absence error that the number of digits having high logic levels in the digital data signals is even over the predetermined period.

OBJECTS OF THE INVENTION

The principal object of this invention is to provide a supplementary information transmitting arrangement for a digital transmission system in which the supplementary information signal is transmitted over the transmission medium for the digital data signal without resorting to the use of an auxiliary transmission medium.

Another object of this invention is to transmit and receive the supplementary information signal by means of a supplementary transmission and reception devices which are constituted by very simple component circuits.

A further object of this invention is to insert parity check digits in the digital data signal over predetermined periods of time, the logic levels of which modify the parity of the digital data signal as a function of the logic level or the phase of the supplementary information signal.

Yet another object of this invention is to modify the parity of the digital data signal which is a ternary coded pseudo-randomized signal having a constant accumulated disparity, by changing or not changing a ternary word as a function of the logic level or phase of the supplementary information signal.

SUMMARY OF THE INVENTION

Accordingly, the invention provides a supplementary information transmitting arrangement for a digital data transmission system which comprises:

means receiving an incoming digital data signal and a digital supplementary information signal having a rate much lower than that of said incoming digital data signal for inserting parity check words in said incoming data signal into a resulting digital data signal, the logic level of digits of said parity check words being as a function of the logic level of said supplementary information signal so that the accumulated parity of said resulting digital data signal is constant between two successive parity check words, and means receiving the resulting digital data signal including said parity check words for detecting the parity modifications in said resulting data signal to restore said supplementary information signal.

According to this invention, the accumulated disparity of the resulting digital data signal is not constant, but alternates as a function of the logic level or the phase of the supplementary information signal. The parity check words are inserted in the incoming digital signal periodically or by replacing a predetermined digit group having a certain redundancy.

According to a first embodiment, the inserting of parity check words consists in slightly increasing the rate of the incoming digital signal into a second digital data signal including data words which have a predetermined number of digits and each are followed by a time interval or gap having a duration equal to a check parity word. A first or a second predetermined parity check word is inserted in each time interval when the parity of the preceding data word of the second digital signal and the desired parity signalled by the logic level of the supplementary information signal at the end of the time interval are different or equal. Under these conditions, the parity of the resulting outgoing digital data signal from the transmission device is constant between a rise flank and a fall flank of the supplementary information signal. For example, this parity is even when the logic level of the supplementary information signal is low, and is odd when the logic level of the supplementary information signal is high.

This first embodiment is applicable in the case of a binary-coded digital signal or of a bipolar-coded digital signal. When a bipolar-coded digital signal is used, the logic high level digits may be taken into account, whether they are positive or negative, after a bipolar-to-binary conversion.

According to a second embodiment, the incoming digital data signal is scrambled into a scrambled or pseudo-randomized binary disparity signal whose accumulated disparity is constant over a predetermined period of time. In this case, a predetermined four-digit binary group is detected in the ramdomized signal after series-to-parallel four bit conversion. The predetermined parity check words are inserted by modifying or not modifying the parity of the ternary word corresponding to the predetermined binary digit word when the desired parity indicated by the logic level of the supplementary information signal and the parity of the ternary word preceeding the predetermined ternary word are different or equal.

According to this second embodiment, various line codes for binary-to-ternary transcoding the scrambled signal may be used, such as the known code MS43 preferably or the known code 4B3T.

In the MS43 code, each of the sixteen four-bit binary words corresponds to one of the three ternary digit words of three different alphabets $A_1$, $A_2$ and $A_3$. Six of the sixteen binary words are always represented by the same six ternary words having zero disparity, and the remaining ten binary words are represented by the same ternary word having non-zero disparity and the same sign in two of the alphabets, or by a ternary word in a third alphabet having a different non-zero disparity but the opposite sign.

In the usual way, the choice of the alphabets $A_1$, $A_2$ and $A_3$ is determined by the accumulated disparity or "digital sum" of the levels 1 and $-1$ specified at the end of each ternary word. The digital sum is arbitrarily limited to the values $-2$, $-1$, 0 and 1; to this end, the alphabet $A_1$ is used for each ternary word when the digital sum at the end of the preceding ternary word equals $-2$, the alphabet $A_2$ is used when this same sum equals $-1$ or 0, and the alphabet $A_2$ is used when this same sum equals $+1$. This is in accordance with conventional usage of the three-level MS43 code.

The following table I shows the three alphabets in the MS43 code:

TABLE 1

| BINARY | $A_1$ | disparity | $A_2$ | disparity | $A_3$ | disparity |
|---|---|---|---|---|---|---|
| 0 0 0 0 | + − 0 | 0 | + − 0 | 0 | + − 0 | 0 |
| 0 0 0 1 | + + 0 | +1 | 0 0 − | −1 | 0 0 − | −1 |
| 0 0 1 0 | + 0 + | +2 | 0 − 0 | −1 | 0 − 0 | −1 |
| 0 0 1 1 | 0 + + | +2 | − − + | −1 | − − + | −1 |
| 0 1 0 0 | + + − | +1 | + − − | −1 | + − − | −1 |
| 0 1 0 1 | 0 − + | 0 | 0 − + | 0 | 0 − + | 0 |
| 0 1 1 0 | − 0 + | 0 | − 0 + | 0 | − 0 + | 0 |
| 0 1 1 1 | + − + | +1 | + − + | −1 | − − − | −3 |
| 1 0 0 0 | + + + | +3 | − + − | −1 | − + − | −1 |
| 1 0 0 1 | + 0 − | 0 | + 0 − | | + 0 − | 0 |
| 1 0 1 0 | 0 + − | 0 | 0 + − | 0 | 0 + − | 0 |
| 1 0 1 1 | − + + | +1 | − + + | +1 | 0 − − | −1 |
| 1 1 0 0 | + 0 0 | +1 | + 0 0 | +1 | − 0 0 | −1 |
| 1 1 0 1 | 0 + 0 | +1 | 0 + 0 | +1 | − 0 − | −2 |
| 1 1 1 0 | 0 0 + | +1 | 0 0 + | +1 | − − 0 | −2 |
| 1 1 1 1 | − + 0 | 0 | − + 0 | 0 | − + 0 | 0 |

By way of example, adaptation of the MS43 code for the purposes of the invention entails retaining the whole of the table I and the above-stated rules, with the exception of the thirteenth line of the table I which corresponds to the predetermined four-bit group 1100. This line is replaced by the two lines set out in the table II below:

TABLE II

| Binary | $A_1$ | $A_2$ | $A_3$ | disparity |
|---|---|---|---|---|
| 1 1 0 0 | 0 0 0 | 0 0 0 | 0 0 0 | modified |
|  | + 0 0 | + 0 0 | − 0 0 | unaltered |

The first of these two lines of the table II is used if the existing "H" level parity is to be modified, and the second line is used if the existing "H" level parity is to be unaltered. Further, choice of the alphabets $A_1$, $A_2$ and $A_3$ is always made as a function of the digital sum of the preceding ternary word.

At the reception end, the arrangement by means of which the low-frequency wave representative of the supplementary information signal is restored, is composed of means such as a clocked bistable device for detecting the parity of the resulting digital data signal and a band pass filter connected to said parity detecting means and having its band pass centred on a frequency which is the same as or a multiple of the frequency of said low-frequency wave.

However, when transmission of the resulting digital data signal is impaired through the presence of errors, a better reception of the supplementary information signal transmitted is obtained by interconnecting between the parity detecting means and the band pass filter a low pass filter and a full-wave rectifying means.

BRIEF DESCRIPTION OF THE DRAWING

The present invention will now be described in detail with reference to the accompanying drawings in which:

FIG. 3 shows pulse diagrams to explain the operation of the parity check word inserting circuit of the transmission device of FIG. 1;

FIG. 4 shows pulse diagrams to explain the operation of the modulating circuit of the transmission choice of FIG. 1;

FIG. 5 is a detailed block diagram of the parity check word inserting circuit of the transmission device of FIG. 1;

FIG. 7 is a schematic block diagram of the transmission device according to the second embodiment of the invention;

FIG. 8 is a schematic block diagram of a reception device for restoring the supplementary information;

FIG. 9 is a schematic block diagram of another reception device for restoring the supplementary information, this reception device being mainly used when transmission of the digital signal is impaired through the presence of errors.

DESCRIPTION OF THE PREFERRED EMBODIMENTS

Figure 1:
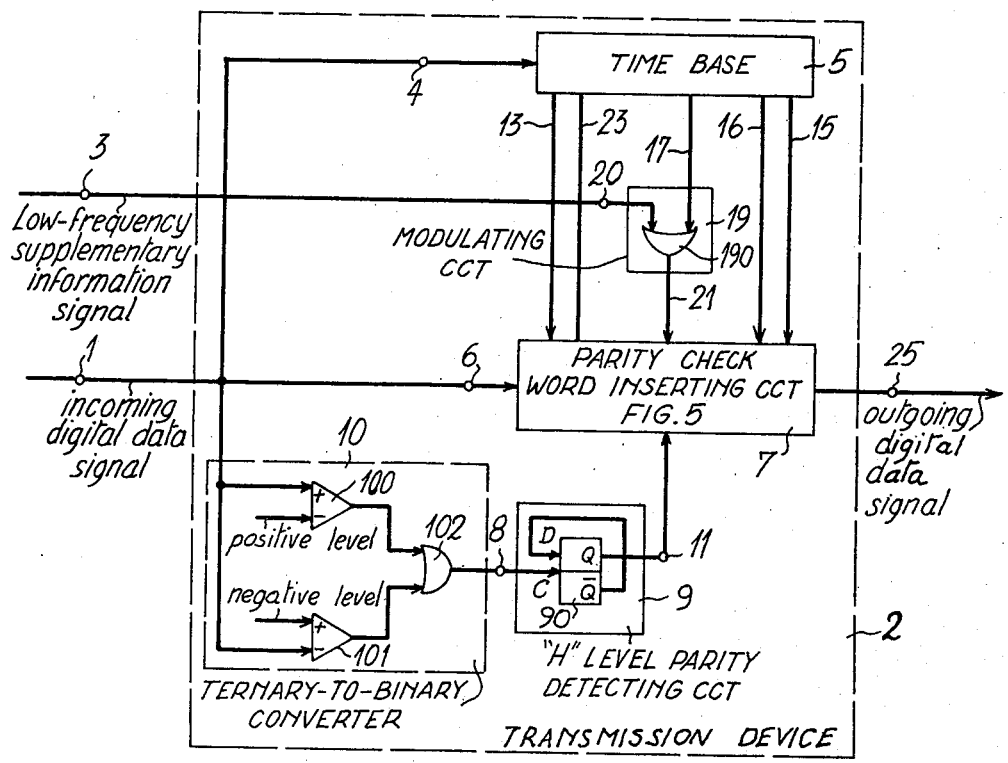
FIG. 1 is a schematic block diagram of the transmission device according to the first embodiment of the inveniton.

Referring to FIG. 1, the incoming digital data signal with a high digit rate is fed to an input terminal 1 of the transmission device 2 according to the first embodiment of the invention. The incoming data signal includes serial binary or ternary coded digits. The supplementary information signal is fed to another input 3 of the transmission device 2. The supplementary information signal is a digital low-frequency signal having a binary digit rate which is much lower in comparison with the rate of the incoming data signal.

Figure 2:
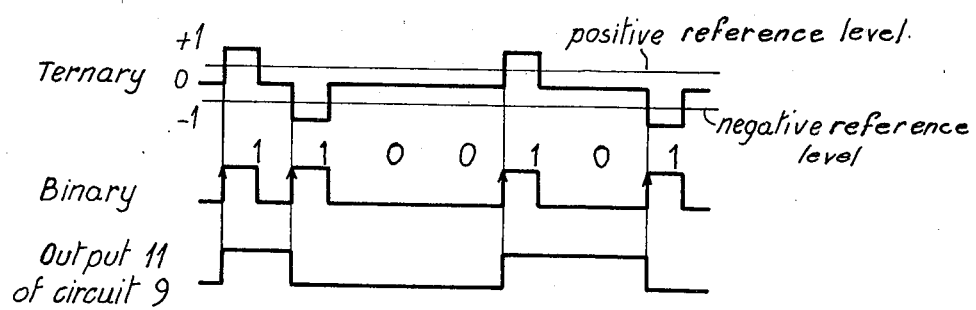
FIG. 2 shows pulse diagrams to explain the operation of the parity detecting circuit and, if desired, the ternary-to-binary converter of the transmission device of FIG. 1.

The input terminal 1 is connected to the input terminal 4 of the re-timing circuit contained in a time-base 5, to the input terminal 6 of a parity check word inserting circuit 7 and to the input terminal 8 of a "H" level parity detecting circuit 9. The circuit 9 operates as a divide-by-2 divider whose outputting logic state depends upon the parity of the digits applied to its input terminal 8. The circuit 9 is constituted by a toggle 90. In a known manner, a toggle is D-type flip-flop whose clock input C receives the incoming digit signal from the input 8, whose inverse output Q is connected to its input D and whose direct output Q is the output 11 of the circuit 9. The third line of FIG. 2 shows the signal which indicates the parity of the incoming binary signal ... 100101 ... shown in the second line of FIG. 2. The state of the signal at the output 11 alters in response to each rising flank of the incoming binary signal at the input 8. When the incoming digital data signal includes ternary coded digits, the toggle 90 is preceded by a ternary-to-binary converter 10, whose block is illustrated in dashed line in FIG. 1. Generally speaking, the converter 10 is a bipolar-to-binary converter which comprises two voltage comparators 100 and 101. The direct input of the comparator 100 and the inverse input of the other comparator 101 are connected to the input terminal 1. The inverse input of the comparator 100 and the direct input of the other comparator 101 receive a reference level set mid-way between the positive (+1) and zero logic levels and a reference set mid-way between the zero and negative (−1) logic levels, respectively. The outputs of the comparators 100 and 101 apply the corresponding positive and negative binary signals to the input 8 of the circuit 9 via an OR gate 102. The first line of FIG. 2 shows an incoming ternary-coded digit signal which produces the parity indicating signal at the terminal 11 shown in the third line of FIG. 2.

The time base 5 delivers five various clock signals for controlling the parity check digit inserting circuit 7 through wires 13, 23, 15, 16 and 17. The clock signals on the wires 13 and 23 have frequencies equal to the rate of the incoming and outgoing data signals of the transmission device 2 and are shown in the second and fourth lines of FIG. 3. The clock signal on wire 23 includes gaps or blank bits for defining the positions of the parity check digits in the outgoing data signal. According to a preferred embodiment, the digit rates of the incoming and outgoing data signals at the input and output terminals 1 and 25 of the transmission device 2 are 100 M bit/s and 130 M bit/s, as shown in first and last lines of FIG. 3. A parity check word comprises three bits. Each check word is included in a 3-blank bits gap of the incoming data signal after a 10-bit word of the incoming data signal. The time base also delivers a clock signal at the frequency of the outgoing data signal and a synchronizing signal at the frequency of the check words equal to 13 MHz on the wire 15 and 16, as shown in seventh and sixth lines of FIG. 3.

The clock signal on the output wire 17 of the time base 5 is the low-frequency carrier wave of the supplementary information signal. The carrier wave is a digital signal at rate of 100 K bit/s and modulates the supplementary information signal in a modulating circuit 19 which may include an OR gate 190. The inputs of gate 190 are connected to the terminal 3 and wire 17. The gate 190 delivers the modulated supplementary information signal on the output wire 21 to the circuit 7. The signals received and delivered by the OR gate 190 are shown in FIG. 4. It will be noted that the period of the carrier signal is very high compared with the period of the gaps or the period of the check words. For example, the high logic level and the low logic level of the modulated supplementary information imply odd and even parities in the outgoing data signal as described hereinafter.

According to another variant of the invention, the supplementary information signal is not modulated by a carrier signal. In Fig. 1, the gate 190 is deleted and the input terminal 3 is directly connected to the wire 21.

FIG. 5 illustrates in greater detail the parity check word inserting circuit 7. This circuit 7 comprises mainly a buffer store 30, a parity controlling circuit 33 and a check digit inserting circuit 36.

The write-in clock signal and the read-out clock signal for the buffer store which receives the incoming digital data signal at the input 6, are applied from a writing counter 31 and a reading counter 32 which receive the clock signals over the output wires 13 and 23 from the time base 5, as shown in second and fourth lines of FIG. 3. The data signal at the output 38 of the buffer store 30 has a rate equal to that of the outgoing data signal and includes 3-bit gaps in which will be inserted the parity check words, as shown in third line of FIG. 3.

The parity controlling circuit 33 is proper to modify the parity of the incoming data signal under the control of the desired parity signalled by the modulated supplementary information signal by comparison with the parity of the incoming data signal which is indicated by the outputting signal from the parity detecting circuit 9. The circuit 33 comprises an OR-Exclusive gate 330, a comparator gate 331, i.e. comparator gate functions as an OR-Exclusive gate and an output inverter, and a D-type flip-flop 332. The inputs of the gate 330 are connected to the output 11 of the parity detecting circuit 9 and the output Q of the flip-flop 332. The gate 330 modifies the parity of the incoming data signal as a function of the state of the signal at the output Q which indicates the parity of the outgoing data signal, relatively to the previous check word. The inputs of the comparator gate 331 are connected to the output of the OR-Exclusive gate 330 and the output wire 21 of the modulating circuit 19. The gate 331 compares the desired parity which is indicated by the level of the modulated supplementary information signal, with the parity of the outgoing data signal which will be obtained without the previous check word and which is indicated by the level of the signal outputting from the gate 330.

The input D of the flip-flop is connected to the output of the gate 331. The clock input C of the flip-flop 332 is fed to the synchronizing signal on the wire 16. We shall now assume that the two check words are 110 and 100. When the desired parity is even, i.e. the logic level of the modulated supplementary information signal is low, then the first check word 100 is used when the parity of the previous 10-bit word of the incoming data signal is to be changed, i.e. the high bit number of the previous 10-bit word is odd, and the second check word 110 is used when the parity of the previous 10-bit word of the incoming data signal is to be maintained in a condition which is unaltered, i.e. the high bit number of the previous 10-bit words is now even. When the desired parity is odd, i.e. the logic level of the modulated supplementary information is high, the result is reversed for the first 10-bit word of the incoming data signal occurring after the rising flank of the modulated supplementary information signal, and the result is to be maintained unaltered for the other following 10-bit words, i.e. the state of output Q of flip-flop 332 is not modified and the states of the input 11 and the output of the OR-Exclusive gate 330 are inverted and consequently, the state of the output of the gate 331 is maintained in the unmodified state. The fifth line of FIG. 3 shows the output parity signal which is delivered from the output 34 of the parity controlling circuit 33 connected to the output Q of the flip-flop 332.

Figure 6:
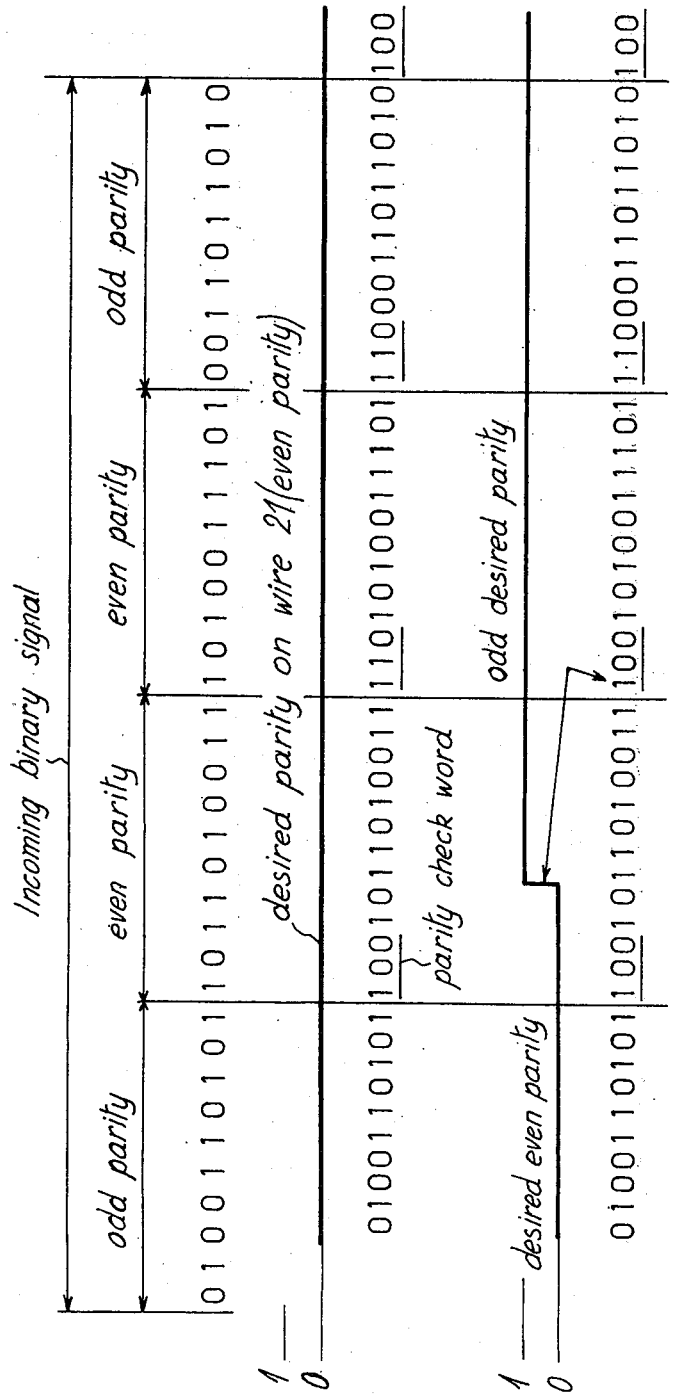
FIG. 6 shows two examples of the resulting digital data signal for a given incoming digital data signal and a given supplementary information signal.

An example of an incoming data signal is shown in the first line of FIG. 6. In this figure, the second and third line show the corresponding data outgoing signal when the desired parity is even, i.e. when the level of the modulated supplementary information is low. The fourth and fifth lines of FIG. 6 show the corresponding data outgoing signal when the desired parity is even which occurs to the end of the first 10-bit word, then is odd from the second 10-bit word.

Referring now to FIG. 5, the check digit inserting circuit 36 includes a shift register which has four stages, each of these including a D-type flip-flop 360, 361, 362 and 363. The clock input C of these D-type flip-flops 360, 361, 362, and 363 receives the clock signal at the frequency of the outgoing data signal from the time base 5, via the wire 15. The incoming data signal with 3-bit gaps (these 3-bit gaps constituting time intervals) delivered from the output 38 of the buffer store 30 is applied to the input terminal 37 of the circuit 7 which is connected to input D of the first flip-flop 360.

The synchronizing signal on the wire 16 which indicates the beginning of the position of a parity check word in the outgoing data signal, is fed to inputs of two AND-gates 364, 365, to an NAND gate 336 and to an inverter 367. The other inputs of gates 364, 365 and 366 are connected to the output Q of the first, second and third flip-flop 360, 361 and 362. The outputs Q and $\bar{Q}$ of the flip-flop 362 are connected therebetween. The time for charging the check words as a function of the output parity signal on the output 34 of the circuit 33 is indicated by the synchronizing signal.

The output 34 is connected to the input 35 of the circuit 36 which is applied to an input of an AND-gate 368 whose other input is connected to the output of the inverter 367. The inputs of an OR-gate 369 are connected to the outputs of the AND-gates 365 and 368. The outputs of the gates 364, 369 and 366 are connected to the inputs D of the second, third and fourth flip-flops 361, 362 and 363 of the shift register, respectively. The output Q of the last flip-flop 363 constitutes the output 25 of the transmission device 2 which delivers the outgoing data digital signal.

When the logic level of the output parity controlling signal on wire 34 is high, the level of the output of the OR gate 369 is high and the inserted parity check word is 110. When the logic level of the output parity controlling signal is low, the inserted parity check word is 100. During the marking of the synchronizing signal at low level, the outputs of the gates 366 and 364 are at high and low levels which correspond to the first and last bits of the parity check words, respectively. The outputting signals of the three last flip-flops 361, 362 and 363 are shown in the three last lines of FIG. 3.

FIG. 7 illustrates a second embodiment of the transmission device 50 according to the invention. The incoming digital data signal coded binary, as shown in the first line of FIG. 3, and the low-frequency supplementary information signal which is not modulated, as shown in the first line of FIG. 4, or is modulated by a carrier signal in a modulating circuit such as the circuit 19 of FIG. 1, as shown in the second and third lines of FIG. 4, are applied to the input terminals 51 and 52 of the device 50.

In the device 50, the incoming binary coded data signal is applied to a scrambling circuit 54 which is driven by a clock signal at the incoming data frequency, as shown in the second line of FIG.3. A scrambled signal, e.g. a pseudo-randomised serial binary signal is delivered from the output 55 of the scrambling circuit 54 and has, in practice, a zero accumulated disparity, i.e. the d.c. component of this pseudo-randomised signal is substantially zero. The zero accumulated difference means that over a predetermined period of time, the number of digits at the high logic level is statistically equal to the number of digits at the low logic level. Nevertheless, the accumulated difference of the pseudo-randomized signal which is delivered by of the scrambling circuit 54 may be substantially constant, i.e. the ratio of numbers of digits at high and low logic levels may be substantially constant during the predetermined period of time in which the incoming binary coded data signal is applied to circuit 54.

The pseudo-randomized signal is applied to the input terminal 56 of a transcoding circuit 57. In a known manner, the transcoding circuit 57 comprises a series-to-parallel converter 570, a binary code-to-ternary code transcoder 571 and a parallel-to-series converter 572. The input converter 570 converts the serialized 4-bit words of the incoming pseudo-randomized signal received at the terminal 56 into parallel 4-bit words which are applied to the inputs a, b, c, d of the transcoder 571. Transcoder 571 is for instance a binary code-to-MS43 code transcoder which includes a programmable store in according to the table I. The 3-digit transcoded ternary word is delivered by the outputs $\alpha$, $\beta$, $\gamma$ of the transcoder 571 and are applied to the inputs of the output converter 572 which delivers the outgoing ternary coded digital data signal at the output 53 of the transmission device 50.

The accumulative disparity or digital sum of the ternary signal appears at two output terminals $S_0$, $S_1$ of the transcoder 571. According to the use of the MS43 code, the digital sum word $S_0$, $S_1$ is 00, 01, 10 and 11 when the digital sum is equal to $-1$, 0, $+1$ and $-2$. The digital sum word is applied to two inputs of the transcoder 571 to select the desired ternary alphabet of the MS43 code for coding of the following 4-bit word.

Since each ternary word contains an integral number of bits at the "H" level, i.e. at the positive and negative levels, the parity of the digital sum at the end of a word is equal to parity of the outgoing signal at the end of this word. According to the various digital sum words, the parity of the outgoing signal at the end of the ternary words is indicated by the second bit $S_1$ of the digital sum word. The parity is odd when the digital sum is equal to $-1$ or $+1$ and the logic of the bit $S_1$ is low or "0". The parity is even when the digital sum is equal to 0 and $-2$ and the logic level of the bit $S_1$ is high or "1".

The transmission device 50 also includes a parity controlling circuit 63 which may be constituted by a comparing gate or an OR-Exclusive gate 630, as illustrated in FIG. 7. The inputs of the gate 630 are connected to the output $S_1$ of the transcoder 571 and the input terminal 52 of the transmission device 50. The parity controlling circuit 63 compares the parity of the previous ternary word of the outgoing signal and the desired parity which is fixed by the phase or logic level of the supplementary information signal which is or is not modulated. The logic level of the comparison resulting signal at the output 64 of circuit 63 is shown in the following table III.

TABLE III

| previous parity | desired $S_1$ parity | input 52 | output 64 | resulting parity | ternary word transcoded from binary word 1100 | | |
|---|---|---|---|---|---|---|---|
| | | | | | $A_1$ | $A_2$ | $A_3$ |
| odd | 0 odd | 1 | 1 | unaltered | +00 | +00 | −00 |
| even | 1 even | 0 | | | | | |
| odd | 0 even | 0 | 0 | modified | 000 | 000 | 000 |
| even | 1 odd | 1 | | | | | |

The right hand half of the table III corresponds to the table II. The comparison resulting signal at output 64 is applied to a controlling terminal 65 of a 1100-binary word detecting circuit which is contained in the transcoder 571. When the transcoder 571 receives simultaneously the incoming binary word 1100 and the comparison resulting signal at low logic level, the outgoing ternary word $\alpha$, $\beta$, $\gamma$ is equal to +00, +00 or −00 if the digital sum of the previous ternary word is equal to $-2$, $-1$ or 0, or $+1$, and the used alphabets of MS43 code are $A_1$, $A_2$ or $A_3$, respectively.

FIG. 8 illustrates a first single embodiment of the receiver device 70, which is required for restoring the low-frequency supplementary information signal. The input terminal 71 of the receiver device 70 receives the outgoing digital data signal from the output of the transmission device 2 (FIG. 1) or 50 (FIG. 7), via the digital transmission medium. The input terminal 71 is connected to the clock terminal C of a toggle 72 through an AND-gate 77 which is controlled by the clock signal at the frequency (130 MHz) of the resulting digital data signal. When the resulting digital data signal is coded in ternary code, the receiver device includes a ternary-to-binary converter 78 which is provided between the output of gate 77 and the input C of the toggle 72.

The operation of the toggle 72 is analogous to that of the detecting parity circuit 9 of FIG. 1. The signal output at 73 of the toggle 72 includes a signal component having the modulated frequency of the supplementary information signal which is applied to the input 3 (FIG. 1) or it may have the modulated frequency of the supplementary information signal which is applied to the input 52 (FIG. 7) of the transmission devices. When no error is included in the resulting data signal then, the output signal from the toggle 72 maintains a steady state after each parity check word.

The output 73 of the toggle 72 is connected to the input terminal 74 of a band pass filter 75 whose output 76 constitutes the output terminal of the receiver device 70 and which restores the low-frequency supplementary information signal. The modulated frequency component is filtered in the frequency of the band pass filter 75. The band pass of the filter 75 is centred on a frequency which is equal to the modulated frequency or is equal to a multiple of the modulated frequency of the supplementary information signal.

Assuming there are errors in the resulting data signal, these errors will introduce a parity modification which causes a change of 180° in phase, i.e. a change which amounts to a change of logic level in the output signal from the toggle 72. In this case, the transmission device 70 delivers an amplitude modulated signal in response to each phase change.

The receiver device 80 which is shown in FIG. 9 obviates the drawback, responding to phase change i.e. when the received data signal is impaired through the presence of errors. At the input, the device 80 comprises an AND-gate 77 and a toggle 72 and, when desired, a ternary-to-binary converter 78. The input 82 of a low pass filter 81 is connected to the output 73 of the toggle 72. The signal delivered by the low pass filter 81 is a signal in which there occurs a shift in the phase. The input 84 of a full-wave rectifier 83 is connected to the output terminal 85 of the low pass filter 81. A band pass filter 86 which has its input terminal 87 is connected to the output terminal 88 of the rectifier 83. The output terminal 89 of the band pass filter 86 shown in FIG. 9, is the output terminal of the receiver device 80 in this Figure and the band pass filter 86 restores the low-frequency supplementary informaion signal. The rectifier 83 and the band pass filter 86 contributes to eliminate errors occurring in the received data signal.

For convenience, the cutoff frequency of the low pass filter 81 is slightly above the modulated frequency of the low-frequency supplementary information signal. The central frequency of the band pass of the band pass filter 86 is equal to double that of the frequency of modulated frequency.

The transmission and reception devices embodying the invention can be used with advantage whenever it is desired to transmit, simultaneously and over the same transmission medium, a digital data signal and a low-frequency supplementary information signal. Transmisson of the resulting digital signal may then in itself constitute information; for example, the measurement of its voltage level at any point in the transmission medium provides information as to the quality of transmission of the digital data signal. In conjunction with this, the low-frequency supplementary information signal may be modulated to transmit particular information between two main terminal stations or between a main terminal station and a series of intermediate repeaters.

It will be noted that the two parity check words may be designated by 100 and 000 or, in a general manner, may be two words having the same digit number and digital sums which are different, i.e. even and odd. The ternary code used for the line code may be another known code such as the 4B3T code having two alphabets.

What we claim is:

1. A supplementary information transmitting arrangement for a digital data transmission system comprising a transmitter means and a receiver means;

said transmitter means (2) receiving an incoming digital data signal and a digital supplementary information signal having a low frequency wave representative of a rate which is much lower than the frequency of said incoming digital data signal for the purpose of inserting digital parity check words into said incoming digital data signal and to produce thereby a resulting digital data signal;

said transmitter means further comprising parity check word inserting means (11, 7) controlling the logic levels of the digits of said digital parity check words being inserted into the incoming digital data signal as a function of the logic levels of said supplementary information signal so that the accumulated parity of said resulting digital data signal is constant between two successive parity check words which are inserted from the supplementary information signal;

said receiver means (70 or 80) receiving said resulting digital data signal, said receiver means comprising:

means (72) for detecting the parity modification in said resulting digital data signal; and a band pass filter (75 or 86) connected to said parity modification detecting means and having its band pass centered on a frequency which is the same as or a multiple of said frequency of said low-frequency wave representative of said supplementary information signal, and restoring said supplementary information signal.

2. A supplementary information transmitting arrangement according to claim 1 in which said receiver means (80) further comprises a low pass filter (81) connected to the output of said parity modification detecting means (72), and rectifying means (83) interconnected between the output of said low pass filter (81) and to the input of said band pass filter (86).

3. A supplementary information transmitting arrangement according to claim 2 in which the frequency pass band of said band pass filter is centered on a frequency which is twice the frequency of the low-frequency wave representative of said supplementary information signal.

4. A supplementary information transmitting arrangement according to claim 1 comprising modulating means (19) for modulating said digital supplementary information signal by a digital carrier signal which has a rate less than that of said incoming data signal and which is applied to an input of said parity check word inserting means, and in which parity check word inserting means (11, 7) comprises:

storing means (30, 31, 32) receiving said incoming digital data signal (6) for delivering a second digital data signal (38) having a rate slightly higher than the rate of said digital data signal and including data words, each data word having a predetermined number of digits and each being followed by an interval having a duration equal to a check parity word;

parity indicating means (9) receiving said incoming digital data signal for producing a signal indicating the parity of said incoming digital data signal;

parity controlling means (33) receiving said modulated digital supplementary information signal and said parity indicating signal for delivering a parity controlling signal (34) whose logic level indicates if the accumulated parity of said second digital data signal between two time intervals must be modified or not modified with regard to the desired parity signalled by the logic level of said digital supplementary information signal at the end of first of said two time intervals; and parity modifying means (36) receiving said second digital data signal and controlled by said parity controlling signal for inserting a first or a second parity check word into each time interval of said second digital data signal, said first or second parity check word being inserted when the parity of the preceding data word of said second digital data signal is to be modified or is not modified.

5. A supplementary information transmitting arrangement according to claim 4 in which said first and second parity check words are taken from a set of 110 and 100 or a set of 100 and 000.

6. A supplementary information transmitting arrangement according to claim 4 in which said parity controlling means (33) comprises an OR-Exclusive gate (330) receiving said parity gate (331) receiving said digital supplementary information signal and the signal outputting from said OR-Exclusive gate and a bistable flip-flop means (332) including a clock (16) which is timed by a signal having the frequency of said time intervals or parity check words, which is connected to the output of said comparing gate (331) and which delivers said parity controlling signal (34).

7. A supplementary information transmitting arrangement according to claim 4 including bipolar-to-binary converting means (10) which is provided at the input (8) of said parity indicating means (9).

8. A supplementary information transmitting arrangement according to claim 4 in which said parity check word inserting means (FIG. 7) further comprises:

means (51) for scrambling said incoming digital data signal into a scrambled signal having a constant accumulated disparity over a predetermined period of time, binary-to-ternary transcoding means (571) for transcoding groups of m-serial binary digits of said scrambled signal into n-serial ternary digit words of said resulting digital data signal according to a predetermined ternary code, means (63) receiving said digital supplementary information signal (52) modulated or not modulated and accumulative disparity signal of said ternary words (50, 51) from said binary-to-ternary transcoding means (571) for comparing the desired parity indicated by the logic level of said digital supplementary information signal and the parity of the preceding ternary word indicated by said accumulative disparity signal, and means (65, 671) detecting a predetermined binary digit group and controlling by said comparing means for modifying or not modifying the parity of the ternary word corresponding to the transcoding of said predetermined binary digit group when said desired parity and said preceding ternary word parity are different or equal.

9. A supplementary information transmitting arrangement as claimed in claim 8 in which said comparing means (63) is an OR-Exclusive gate or a comparing gate.

10. A supplementary information transmitting arrangement as claimed in claim 8 in which said predetermined ternary code is the three-level MS43 code having three alphabets $A_1$, $A_2$, $A_3$, said predetermined binary group being the 4-bit word 1100 and the 1100 word detecting means (65, 671) replacing said ternary word $+00$ or $-00$ corresponding to the transcoding of said predetermined binary group 1100 according to said alphabets $A_1$, $A_2$, $A_3$, respectively by the ternary word 000 when said desired parity and said preceding ternary word parity are different from each other.

* * * * *